(12) United States Patent
Ohira et al.

(10) Patent No.: US 12,482,833 B2
(45) Date of Patent: Nov. 25, 2025

(54) AIR-COOLED FUEL CELL SYSTEM

(71) Applicant: TOYOTA JIDOSHA KABUSHIKI KAISHA, Toyota (JP)

(72) Inventors: Hironori Ohira, Nisshin (JP); Hideaki Tanaka, Susono (JP); Nobuaki Nonoyama, Chiryu (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 585 days.

(21) Appl. No.: 18/064,462

(22) Filed: Dec. 12, 2022

(65) Prior Publication Data

US 2023/0197984 A1 Jun. 22, 2023

(30) Foreign Application Priority Data

Dec. 16, 2021 (JP) ................................. 2021-203783

(51) Int. Cl.
*H01M 8/04* (2016.01)
*H01M 8/0254* (2016.01)
*H01M 8/04007* (2016.01)
*H01M 8/04014* (2016.01)
*H01M 8/1004* (2016.01)
*H01M 8/10* (2016.01)

(52) U.S. Cl.
CPC ..... *H01M 8/04014* (2013.01); *H01M 8/0254* (2013.01); *H01M 8/04067* (2013.01); *H01M 8/1004* (2013.01); *H01M 2008/1095* (2013.01)

(58) Field of Classification Search
CPC .......... H01M 8/04014; H01M 8/0254; H01M 8/04067; H01M 8/1004; H01M 2008/1095

USPC ......................................................... 429/439
See application file for complete search history.

(56) References Cited

U.S. PATENT DOCUMENTS

| | | | |
|---|---|---|---|
| 2001/0023035 A1* | 9/2001 | Lehnert ............. | H01M 8/04014 429/439 |
| 2009/0042086 A1* | 2/2009 | Ishikawa ............. | H01M 8/0254 429/434 |
| 2011/0053033 A1* | 3/2011 | Kobayashi .......... | H01M 8/2485 429/458 |
| 2012/0122003 A1* | 5/2012 | Nam ................... | H01M 8/2483 429/437 |
| 2015/0280269 A1* | 10/2015 | Suzuki ................ | H01M 8/2475 429/458 |
| 2017/0162884 A1* | 6/2017 | Shimada ............. | H01M 8/0232 |
| 2017/0251575 A1* | 8/2017 | Nakamura ............ | B60L 50/72 |
| 2017/0317362 A1* | 11/2017 | Takehiro ........... | H01M 8/04201 |

(Continued)

FOREIGN PATENT DOCUMENTS

| | | |
|---|---|---|
| JP | S61185871 A | 8/1986 |
| JP | H0620708 A | 1/1994 |

*Primary Examiner* — James M Erwin
(74) *Attorney, Agent, or Firm* — Dickinson Wright, PLLC

(57) ABSTRACT

Provided is an air-cooled fuel cell system, wherein the air-cooled fuel cell system comprises a fuel cell, an oxidant gas system and a cooling gas system; wherein the fuel cell comprises a fuel cell stack comprising stacked unit fuel cells; wherein each of the unit fuel cells comprises a cathode separator having an oxidant gas flow path in a wavy plate form, a membrane electrode gas diffusion layer assembly, an anode separator having a fuel gas flow path in a wavy plate form, and a cooling fin having a cooling gas flow path in a wavy plate form; and wherein the air-cooled fuel cell system has a cooling ability distribution in an oxidant gas flow direction of the oxidant gas flow path.

9 Claims, 9 Drawing Sheets

(56) References Cited

U.S. PATENT DOCUMENTS

| | | | | |
|---|---|---|---|---|
| 2019/0198893 A1* | 6/2019 | Heo | .................... | H01M 8/0267 |
| 2019/0280311 A1* | 9/2019 | Arisawa | ............ | H01M 8/04074 |
| 2020/0335803 A1* | 10/2020 | Jilani | .................. | H01M 8/0265 |

* cited by examiner (1) Oxidant Gas Flow Path Inlet Side — Oxidant Gas Flow Path Outlet Side (2) A-A   Contact Area with Cooling Gas Flow Path: Large → Heat Dissipation: Large (3) B-B   Contact Area with Cooling Gas Flow Path: Medium → Heat Dissipation: Medium (4) C-C   Contact Area with Cooling Gas Flow Path: Small → Heat Dissipation: Small

AIR-COOLED FUEL CELL SYSTEM

TECHNICAL FIELD

The disclosure relates to an air-cooled fuel cell system.

BACKGROUND

Various kinds of techniques relating to fuel cell systems have been proposed.

For example, Patent Literature 1 discloses an air-cooled fuel cell in which unit cells and separators are alternately stacked to form a fuel cell stack, and cooled gas supply ports and discharge ports are alternately disposed along the direction of stacking the unit cells.

Patent Literature 2 discloses a fuel cell which includes a fuel cell power generator (1) and separators (3) that are provided on both surfaces of the fuel cell power generator (1) and in which a fuel gas supply groove (4) and an oxidizing gas supply groove (5) are provided on both surfaces of each separator (3) and each separator (3) is provided with a through hole (10) for cooling the fuel cell power generator (1).

Patent Literature 1: Japanese Patent Application Laid-Open (JP-A) No. 1986-185871
Patent Literature 2: JP-A No. 1994-020708

In an air-cooled fuel cell having a two-flow path structure such that an oxidant gas flow path and a cooling gas flow path are formed in a wavy plate form and intersect with each other, the power generation distribution in the cell (hereinafter may be referred to as "unit cell") plane is varied by the oxygen concentration distribution in the cell plane and the temperature distribution in the cell plane, both of which are inevitable due to the structure, and the performance of the fuel cell is reduced. In the fuel cell of Patent Literature 1, the number of the components may increase. Also in the fuel cell of Patent Literature 1, pressure loss is likely to occur due to its structure, and due to its horizontally long shape, the utilization of the area of the power generation unit during power generation is low.

SUMMARY

The disclosed embodiments of the present disclosure were achieved in light of the above circumstances. An object of the disclosed embodiments is to provide an air-cooled fuel cell system configured to increase the power generation performance of fuel cells.

In a first embodiment, there is provided an air-cooled fuel cell system,
wherein the air-cooled fuel cell system comprises a fuel cell, an oxidant gas system and a cooling gas system;
wherein the fuel cell comprises a fuel cell stack comprising stacked unit fuel cells;
wherein each of the unit fuel cells comprises a cathode separator having an oxidant gas flow path in a wavy plate form, a membrane electrode gas diffusion layer assembly, an anode separator having a fuel gas flow path in a wavy plate form, and a cooling fin having a cooling gas flow path in a wavy plate form;
wherein at least a part of the oxidant gas flow path and at least a part of the cooling gas flow path intersect with each other when viewed from above;
wherein the cooling gas system comprises a cooling gas supplier configured to supply cooling gas to the fuel cell, a cooling gas pipe, and a pressure loss unit upstream from the fuel cell in the cooling gas pipe; and
wherein the air-cooled fuel cell system has a cooling ability distribution in an oxidant gas flow direction of the oxidant gas flow path.

In a second embodiment, the cooling system may have a high ability to cool an inlet side of the oxidant gas flow path and a low ability to cool an outlet side of the oxidant gas flow path.

In a third embodiment, the oxidant gas flow path and the cooling gas flow path may have a contact area distribution such that the contact area between the oxidant gas flow path inlet side and the cooling gas flow path is larger than the contact area between the oxidant gas flow path outlet side and the cooling gas flow path, and the contact area decreases from the oxidant gas flow path inlet side to the oxidant gas flow path outlet side.

In a fourth embodiment, the pressure loss unit may have a pressure loss distribution such that in a flow direction of the oxidant gas flow path, the press pressure is lower on the oxidant gas flow path inlet side than on the oxidant gas flow path outlet side, and the pressure loss increases from the oxidant gas flow path inlet side to the oxidant gas flow path outlet side.

In a fifth embodiment, the cooling gas supplier may be disposed on the oxidant gas flow path inlet side, rather than the center of the oxidant gas flow path.

In a sixth embodiment, the cooling fin may have a fin pitch distribution such that in the flow direction of the oxidant gas flow path, the fin pitch of the cooling gas flow path is narrower on the oxidant gas flow path inlet side than on the oxidant gas flow path outlet side.

In a seventh embodiment, the contact area between the cooling gas flow path and the oxidant gas flow path may be smaller on the cooling gas flow path inlet side than on the cooling gas flow path outlet side.

In an eighth embodiment, the cathode separator may have squeezed parts in a part of the oxidant gas flow path, and in a part where the cooling gas flow path and the oxidant gas flow path intersect and are in contact with each other when viewed from above, a number of contact parts between the cooling gas flow path and the squeezed parts may increase from the oxidant gas flow path inlet side to the oxidant gas flow path outlet side.

In a ninth embodiment, the cathode separator may have squeezed parts in a part of the oxidant gas flow path, and no squeezed parts may be disposed in a part where the cooling gas flow path and the oxidant gas flow path intersect and are in contact with each other when viewed from above.

The air-cooled fuel cell system of the present disclosure can increase the power generation performance of fuel cells.

BRIEF DESCRIPTION OF THE DRAWINGS

In the accompanying drawings.

DETAILED DESCRIPTION

Hereinafter, the embodiments of the present disclosure will be described in detail. Matters that are required to implement the present disclosure (such as common fuel cell structures and production processes not characterizing the present disclosure) other than those specifically referred to in the Specification, may be understood as design matters for a person skilled in the art based on conventional techniques in the art. The present disclosure can be implemented based on the contents disclosed in the Specification and common technical knowledge in the art.

In FIGS. 1 to 10, parameters relating to size (such as length, width and thickness) are not parameters reflecting the actual size.

In the Specification, "-" used to indicate a numerical range, is used to mean that the range includes the numerical values described before and after "-" as the lower and the upper limit values.

Also in the Specification, the upper and lower limit values of the numerical range may be a desired combination.

Figure 10:
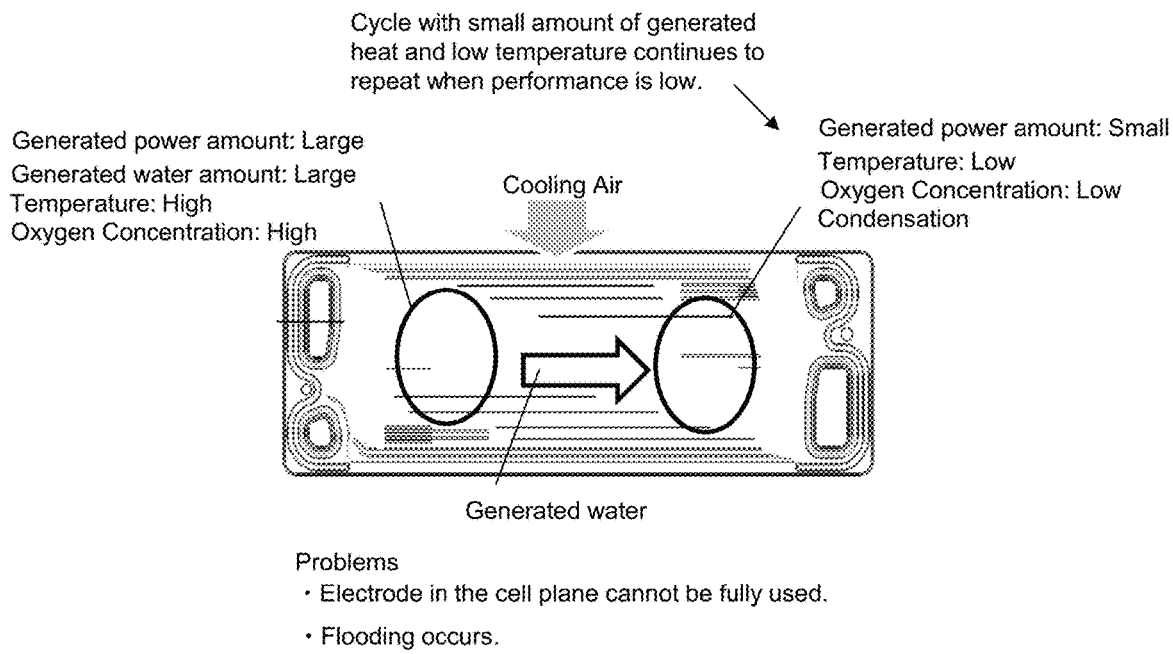
FIG. 10 is a view illustrating a temperature distribution generation mechanism, which is a problem to be resolved by the embodiments of the present disclosure.

FIG. 10 is a view illustrating a temperature distribution generation mechanism, which is a problem to be resolved by the embodiments of the present disclosure. As shown in FIG. 10, in the case of a flow path structure such that the cooling gas of the cooling gas flow path flows in the direction intersecting with the gas flow direction of the oxidant gas flow path, oxygen concentration is higher in the vicinity of the inlet of the oxidant gas flow path than in the vicinity of the outlet of the oxidant gas flow path; the temperature inside the cell increases; and the amount of generated power increases. As a result, the amount of generated water increases. Accordingly, in the vicinity of the outlet of the oxidant gas flow path, the power generation performance of the cell is low; the utilization of the area of the power generation unit in the cell plane is low; and the electrode in the cell plane cannot be fully used. Also in the vicinity of the outlet of the oxidant gas flow path, a decrease in temperature and condensation are likely to occur, and flooding occurs.

The present disclosure relates to increasing the performance of an air-cooled fuel cell (FC). Especially, the present disclosure is effective in suppressing the power generation distribution in the cell plane and suppressing the contact resistance distribution in the cell plane.

It was found that in an air-cooled fuel cell, the temperature of a part with low power generation can be increased by considering a filter, which does not exist in a water-cooled FC structure, as a pressure loss unit and by varying the pressure loss distribution. In addition, it was found that in the air-cooled fuel cell, the temperature distribution can be further varied by changing the position of the cooling gas supplier (such as a fan) and by changing the shape of the flow paths in the in-plane direction, for example.

According to the present disclosure, the power generation performance of the air-cooled fuel cell can be increased by increasing the temperature of the oxidant gas flow path outlet side on which a decrease in oxygen concentration, a decrease in power generation performance, a decrease in temperature, and condensation of generated water are likely to occur. Accordingly, the number of the components of the air-cooled fuel cells system can be reduced, and even if the cell shape is horizontally long, the utilization of the area of the power generation unit during power generation, can be increased.

First Embodiment

The air-cooled fuel cell system of the first embodiment is an air-cooled fuel cell system,
  wherein the air-cooled fuel cell system comprises a fuel cell, an oxidant gas system and a cooling gas system;
  wherein the fuel cell comprises a fuel cell stack comprising stacked unit fuel cells;
  wherein each of the unit fuel cells comprises a cathode separator having an oxidant gas flow path in a wavy plate form, a membrane electrode gas diffusion layer assembly, an anode separator having a fuel gas flow path in a wavy plate form, and a cooling fin having a cooling gas flow path in a wavy plate form;
  wherein at least a part of the oxidant gas flow path and at least a part of the cooling gas flow path intersect with each other when viewed from above;
  wherein the cooling gas system comprises a cooling gas supplier configured to supply cooling gas to the fuel cell, a cooling gas pipe, and a pressure loss unit upstream from the fuel cell in the cooling gas pipe; and
  wherein the air-cooled fuel cell system has a cooling ability distribution in the oxidant gas flow direction of the oxidant gas flow path.

Figure 1:
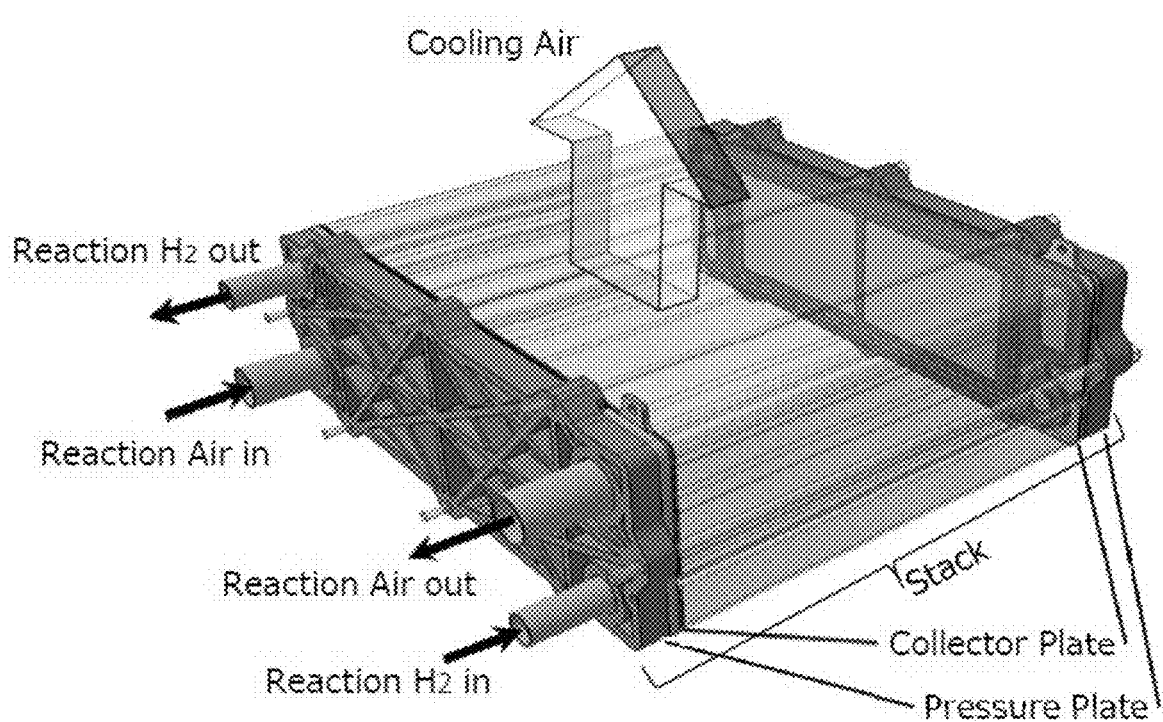
FIG. 1 is a schematic perspective view of an example of the structure of the air-cooled fuel cell of the present disclosure.

FIG. 1 is a schematic perspective view of an example of the structure of the air-cooled fuel cell of the present disclosure.

The air-cooled fuel cell shown in FIG. 1 includes the fuel cell stack (hereinafter may be simply referred to as "stack"), and a collector plate and a pressure plate are disposed in this order at both ends of the stack. The oxidant gas flow path, which is indicated by a reaction air inlet and a reaction air outlet, and the fuel gas flow path, which is indicated by a reaction $H_2$ inlet and a reaction $H_2$ outlet, are disposed to form flows that are opposite to each other. The cooling gas flow path through which cooling air flows, is disposed to intersect with the oxidant gas flow path and the fuel gas flow path.

Figure 2:
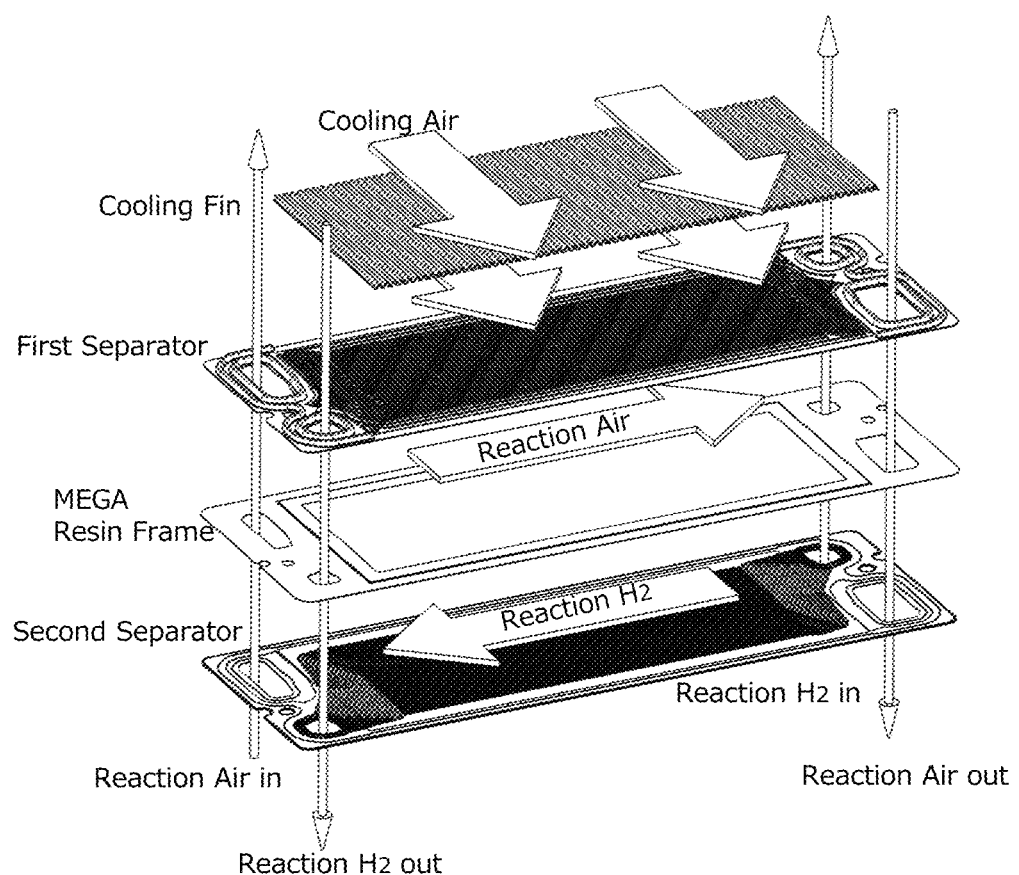
FIG. 2 is a schematic exploded perspective view of an example of a unit fuel cell of the air-cooled fuel cell of the present disclosure.

FIG. 2 is a schematic exploded perspective view of an example of a unit fuel cell of the air-cooled fuel cell of the present disclosure.

The unit fuel cell (hereinafter may be simply referred to as "cell") of the air-cooled fuel cell shown in FIG. 2 includes a cooling fin, a first separator, a resin frame (housing a MEGA in its opening) and a second separator in this order.

The cooling fin is disposed in a region, which is on the side opposite to the MEGA, on a surface of the first separator.

In the first separator, the resin frame and the second separator, the following manifolds are disposed: an oxidant gas supply manifold ("Reaction air in") and an oxidant gas discharge manifold ("Reaction Air out), through both of which reaction air (i.e., the oxidant gas) can flow as indicated by arrows, and a fuel gas supply manifold ("Reaction $H_2$ in") and a fuel gas discharge manifold ("Reaction $H_2$ out"), through both of which hydrogen (i.e., the fuel gas) can flow as indicated by arrows. In the present disclosure, for the sake of simplicity, the oxidant gas supply manifold, the oxidant gas discharge manifold, the fuel gas supply manifold and the fuel gas discharge manifold are collectively referred to as "reaction gas manifold".

In the first separator (the cathode separator), an oxidant gas flow path in a wavy plate form through which reaction air (i.e., the oxidant) can flow as indicated by an arrow, is disposed.

In the second separator (the anode separator), a fuel gas flow path in a wavy plate form through which hydrogen (i.e., the fuel gas) can flow as indicated by an arrow, is disposed.

In the cooling fin, a cooling gas flow path in a wavy plate form through which cooling air or cooling gas (i.e., the refrigerant) can flow as indicated by arrows, is disposed.

The air-cooled fuel cell may have a structure such that the refrigerant flows on the lateral surfaces thereof.

In the present disclosure, the cooling gas flow path is formed to intersect with the flow of air (i.e., the oxidant gas for power generation) and the flow of hydrogen (i.e., the fuel gas). Accordingly, the structure is characterized in that the flow paths in the wavy plate forms are in contact with each other in a manner such that they cross each other.

According to the present disclosure, the temperature distribution as shown in FIG. 10, which is caused when the cooling gas of the cooling gas flow path flows in the direction intersecting with the gas flow direction of the oxidant gas flow path, is improved, and the power generation performance of the cell is increased.

In the first embodiment, the power generation performance of the fuel cell is increased by varying the distribution of the cooling ability in the flow direction of the oxidant gas flow path.

Second Embodiment

In the second embodiment, the cooling gas system may have a high ability to cool the inlet side of the oxidant gas flow path and a low ability to cool the outlet side of the oxidant gas flow path.

In the second embodiment, the temperature of the oxidant gas flow path outlet side on which condensation of generated water is likely to occur, is increased by decreasing the oxygen concentration in the oxidant gas flow path, decreasing the power generation performance of the cell, and decreasing the temperature inside the cell. Accordingly, the power generation performance of the fuel cell is increased.

In the present disclosure, the oxidant gas flow path inlet of the unit fuel cell is a through-hole of the cathode separator, and the through-hole may be an oxidant gas supply hole through which the oxidant gas can be supplied to the oxidant gas flow path on the oxidant gas flow path-forming surface of the cathode separator. The oxidant gas flow path inlet of the fuel cell stack may be the oxidant gas supply manifold formed by connecting oxidant gas supply holes.

Also in the present disclosure, the oxidant gas flow path outlet of the unit fuel cell is a through-hole of the cathode separator, and the through-hole may be an oxidant gas discharge hole through which the oxidant gas can be discharged from the oxidant gas flow path on the oxidant gas flow path-forming surface of the cathode separator. The oxidant gas flow path outlet of the fuel cell stack may be the oxidant gas discharge manifold formed by connecting oxidant gas discharge holes.

Also in the present disclosure, the oxidant gas flow path inlet side may be, in the cell plane of the fuel cell, a region on the upstream side of the oxidant gas flow direction, or it may be, in the cell plane of the fuel cell and when the fuel cell is divided into two equal regions along the oxidant gas flow direction, the region on the upstream side.

Also in the present disclosure, the oxidant gas flow path outlet side may be, in the cell plane of the fuel cell, a region on the downstream side of the oxidant gas flow direction, or it may be, in the cell plane of the fuel cell and when the fuel cell is divided into two equal region along the oxidant gas flow direction, the region on the downstream side.

Third Embodiment

In the third embodiment, the oxidant gas flow path and the cooling gas flow path may have a contact area distribution such that the contact area between the oxidant gas flow path inlet side and the cooling gas flow path is larger than the contact area between the oxidant gas flow path outlet side and the cooling gas flow path, and the contact area decreases from the oxidant gas flow path inlet side to the oxidant gas flow path outlet side.

Figure 3:
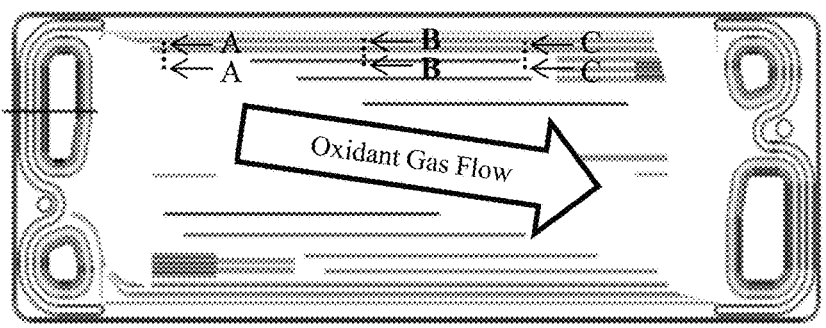
FIG. 3 shows, from top to bottom, (1) a view showing a state that in the air-cooled fuel cell system of the third embodiment, the distribution of the contact area between the cooling gas flow path and the oxidant gas flow path is varied, (2) a sectional view along the line A-A, (3) a sectional view along the line B-B, and (4) a sectional view along the line C-C.
Figure 3:
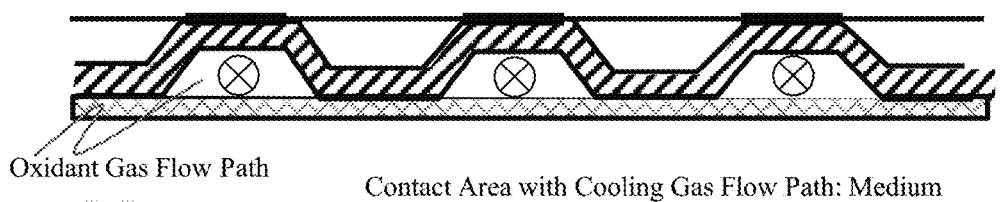
Figure 3:
Figure 3:
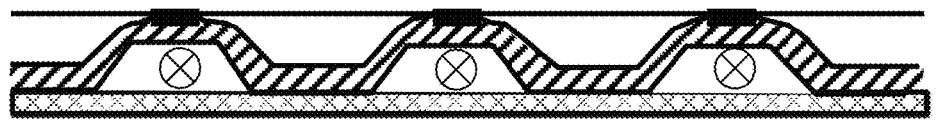

FIG. 3 shows, from top to bottom, (1) a view showing a state that in the air-cooled fuel cell system of the third embodiment, the distribution of the contact area between the cooling gas flow path and the oxidant gas flow path is varied, (2) a sectional view along the line A-A, (3) a sectional view along the line B-B, and (4) a sectional view along the line C-C. As shown in FIG. 3, by use of a correlation between the contact area between the cooling gas flow path and the cathode separator and the heat dissipation of the cooling gas flow path and the cathode separator, in the structure that the wavy plate forms are in contact with each other, the distribution of the contact area between the cooling gas flow path and the ribs forming the oxidant gas flow path in the plane is varied (for example, the oxidant gas flow path outlet-side shape of the ribs forming the oxidant gas flow path, is made close to an arc shape) so that, as for the shape of the oxidant gas flow path (the shape of the side in contact with the cooling gas flow path), the contact area between the cooling gas flow path and the ribs forming the oxidant gas flow path of the cathode separator is larger on the oxidant gas flow path inlet side than on the oxidant gas flow path outlet side. Accordingly, a difference in cooling ability is made, and the temperature of the oxidant gas flow path outlet side is increased.

Fourth Embodiment

In the fourth embodiment, the pressure loss unit may have a pressure loss distribution such that in the flow direction of the oxidant gas flow path, the press pressure is lower on the oxidant gas flow path inlet side than on the oxidant gas flow path outlet side, and the pressure loss increases from the oxidant gas flow path inlet side to the oxidant gas flow path outlet side.

Figure 4:
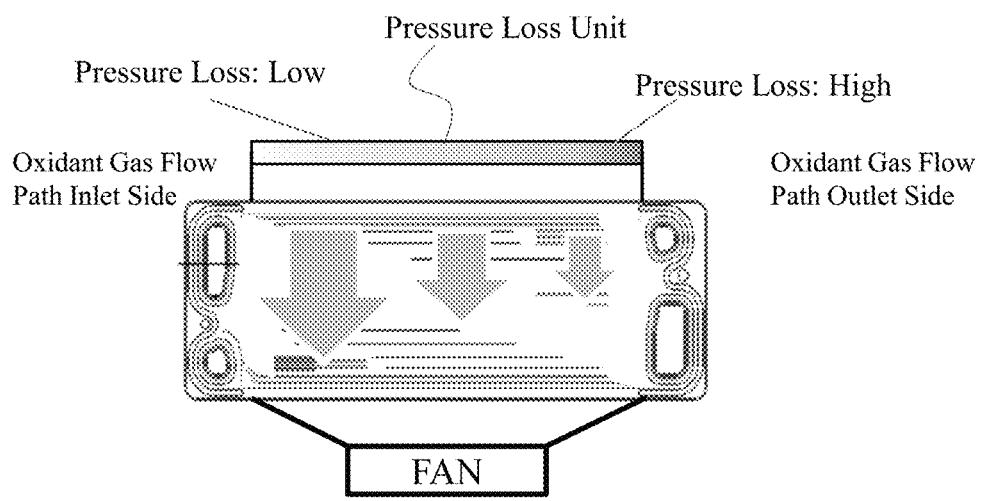
FIG. 4 is a view showing a state that in the air-cooled fuel cell system of the fourth embodiment, the cooling ability distribution is varied by varying the pressure loss distribution in the pressure loss unit.

FIG. 4 is a view showing a state that in the air-cooled fuel cell system of the fourth embodiment, the cooling ability distribution is varied by varying the pressure loss distribution in the pressure loss unit. In the fourth embodiment, to prevent the entry of foreign substances, a filter is preferably disposed on the cooling gas inlet side of the air-cooled FC stack. The temperature of the oxidant gas flow path outlet side is increased by considering the filter as the pressure loss unit and varying the pressure loss distribution of the pressure loss unit in the oxidant gas flow direction so that the pressure loss is smaller on the oxidant gas flow path inlet side than on the oxidant gas flow path outlet side, and the pressure loss increases from the oxidant gas flow path inlet side to the oxidant gas flow path outlet side.

Fifth Embodiment

In the fifth embodiment, the cooling gas supplier may be disposed on the oxidant gas flow path inlet side, rather than the center of the oxidant gas flow path.

Figure 5:
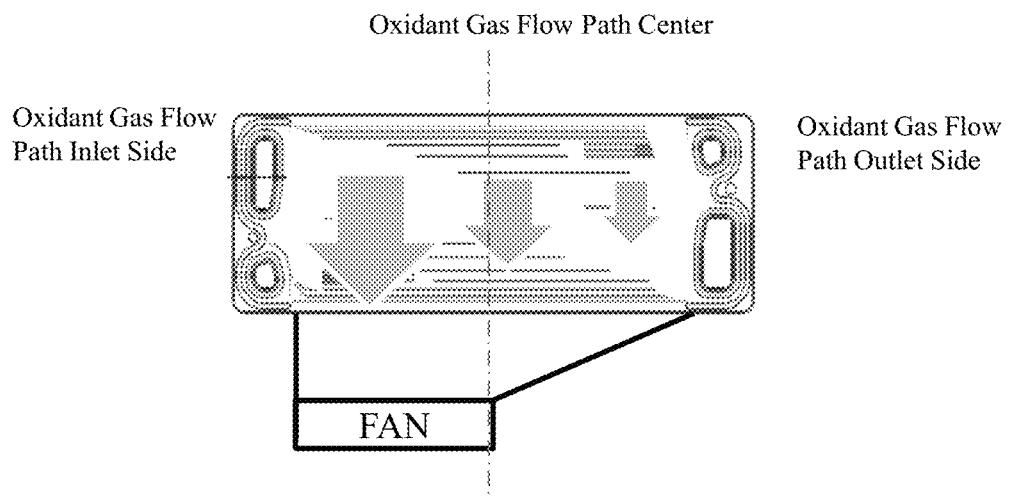
FIG. 5 is a view showing a state that in the air-cooled fuel cell system of the fifth embodiment, the cooling ability distribution is varied by the layout of the cooling gas supplier.

FIG. 5 is a view showing a state that in the air-cooled fuel cell system of the fifth embodiment, the cooling ability distribution is varied by the layout of the cooling gas supplier. In the fifth embodiment, as shown in FIG. 5, the temperature of the oxidant gas flow path outlet side is increased by varying the distribution of the cooling gas flow rate in the flow direction by disposing, as the cooling gas supplier, a cooling gas supplying device (such as a fan) on the oxidant gas flow path inlet side, rather than the center of the air-cooled FC stack or the center of the oxidant gas flow path so that the cooling gas flow rate is larger on the oxidant gas flow path inlet side than on the oxidant gas flow path outlet side.

Sixth Embodiment

In the sixth embodiment, the cooling fin may have a fin pitch distribution such that in the flow direction of the oxidant gas flow path, the fin pitch of the cooling gas flow path is narrower on the oxidant gas flow path inlet side than on the oxidant gas flow path outlet side.

Figure 6:
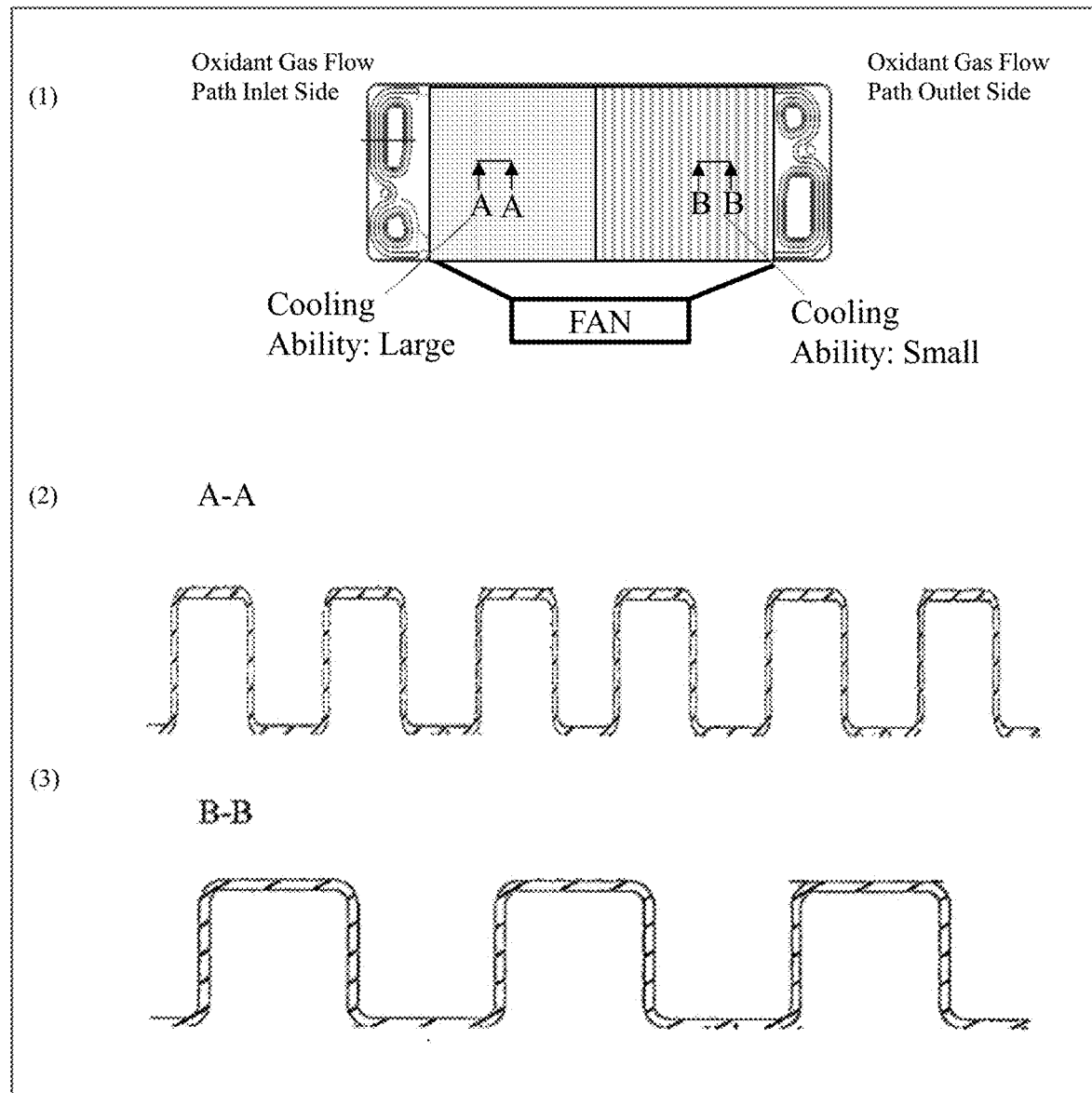
FIG. 6 shows, from top to bottom, (1) a view showing a state that in the air-cooled fuel cell system of the sixth embodiment, the cooling ability distribution is varied by varying the fin pitch distribution, (2) a sectional view along the line A-A, and (3) a sectional view along the line B-B.

FIG. 6 shows, from top to bottom, (1) a view showing a state that in the air-cooled fuel cell system of the sixth embodiment, the cooling ability distribution is varied by varying the fin pitch distribution, (2) a sectional view along the line A-A, and (3) a sectional view along the line B-B. As the fin pitch of the cooling gas flow path gets narrower, the heat dissipation area increases and the cooling ability increases. In the sixth embodiment, the temperature of the oxidant gas flow path outlet side is increased by making the fin pitch narrower on the oxidant gas flow path inlet side than on the oxidant gas flow path outlet side, and by making the fin pitch wider (broader) on the oxidant gas flow path outlet side than on the oxidant gas flow path inlet side.

Seventh Embodiment

In the seventh embodiment, the contact area between the cooling gas flow path and the oxidant gas flow path may be smaller on the cooling gas flow path inlet side than on the cooling gas flow path outlet side.

Figure 7:
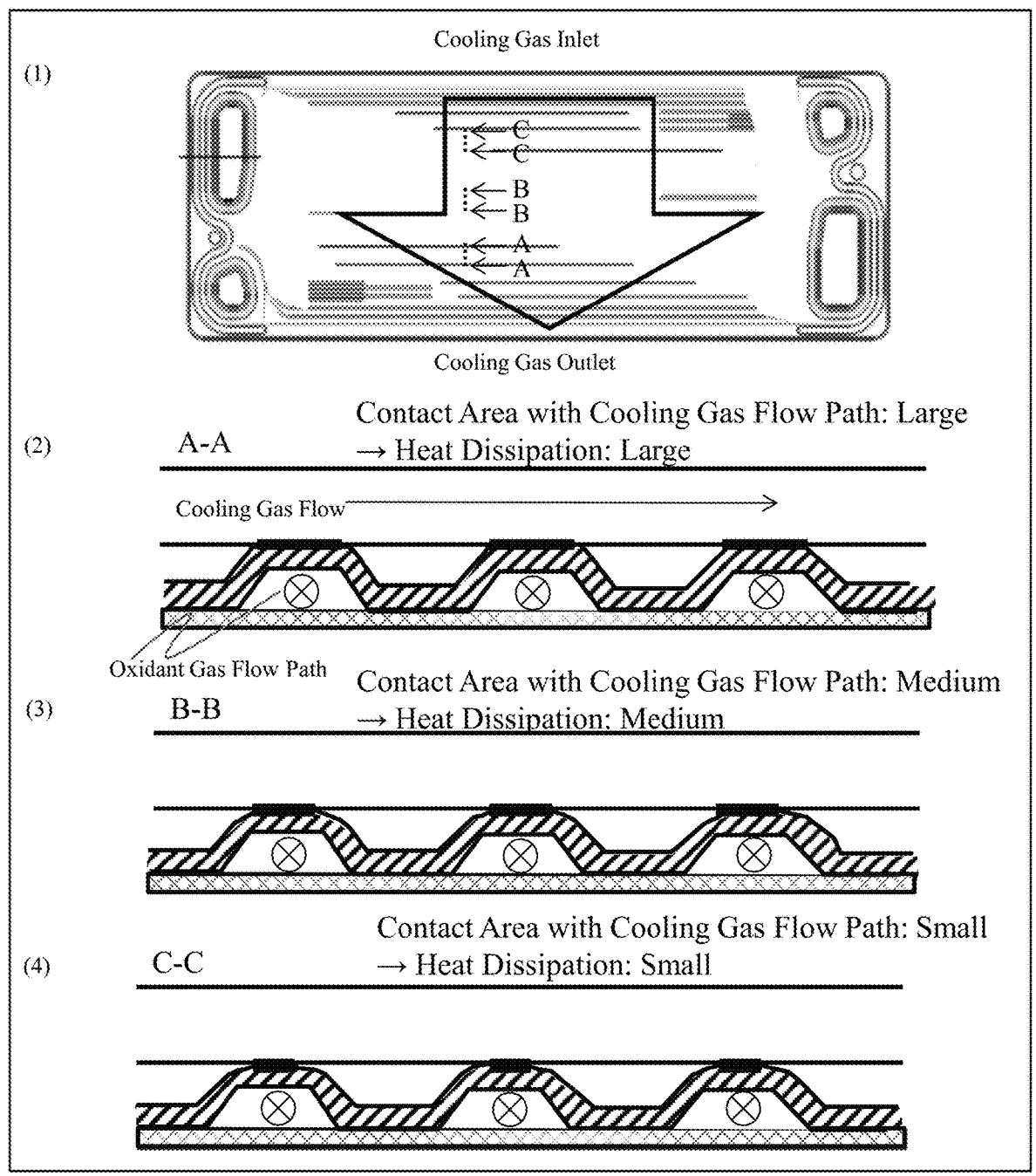
FIG. 7 shows, from top to bottom, (1) a view showing a state that in the air-cooled fuel cell system of the seventh embodiment, the distribution of the contact area between the cooling gas flow path and the oxidant gas flow path is varied to improve the temperature distribution in the flow direction of the cooling gas flow path, (2) a sectional view along the line A-A, (3) a sectional view along the line B-B, and (4) a sectional view along the line C-C.

FIG. 7 shows, from top to bottom, (1) a view showing a state that in the air-cooled fuel cell system of the seventh embodiment, the distribution of the contact area between the cooling gas flow path and the oxidant gas flow path is varied to improve the temperature distribution in the flow direction of the cooling gas flow path, (2) a sectional view along the line A-A, (3) a sectional view along the line B-B, and (4) a sectional view along the line C-C.

As shown in FIG. 7, the contact area between the cooling gas flow path and the oxidant gas flow path is smaller on the cooling gas flow path inlet side than on the cooling gas flow path outlet side, thereby decreasing the heat dissipation of the cooling gas flow path inlet side and increasing the heat dissipation of the cooling gas flow path outlet side. Accordingly, the temperature difference between the cooling gas flow path inlet side and the cooling gas flow path outlet side is decreased, and the cell power generation performance difference between the cooling gas flow path inlet side and the cooling gas flow path outlet side is reduced.

Also in the present disclosure, the cooling gas flow path inlet side may be, in the cell plane of the fuel cell, a region on the upstream side of the cooling gas flow direction, or it may be, in the cell plane of the fuel cell and when the fuel cell is divided into two equal regions along the cooling gas flow direction, the region on the upstream side.

Also in the present disclosure, the cooling gas flow path outlet side may be, in the cell plane of the fuel cell, a region on the downstream side of the cooling gas flow direction, or it may be, in the cell plane of the fuel cell and when the fuel cell is divided into two equal region along the cooling gas flow direction, the region on the downstream side.

Eighth Embodiment

In the eighth embodiment, the cathode separator may have squeezed parts in a part of the oxidant gas flow path, and in a part where the cooling gas flow path and the oxidant gas flow path intersect and are in contact with each other when viewed from above, the number of contact parts between the cooling gas flow path and the squeezed parts may increase from the oxidant gas flow path inlet side to the oxidant gas flow path outlet side.

Figure 8:
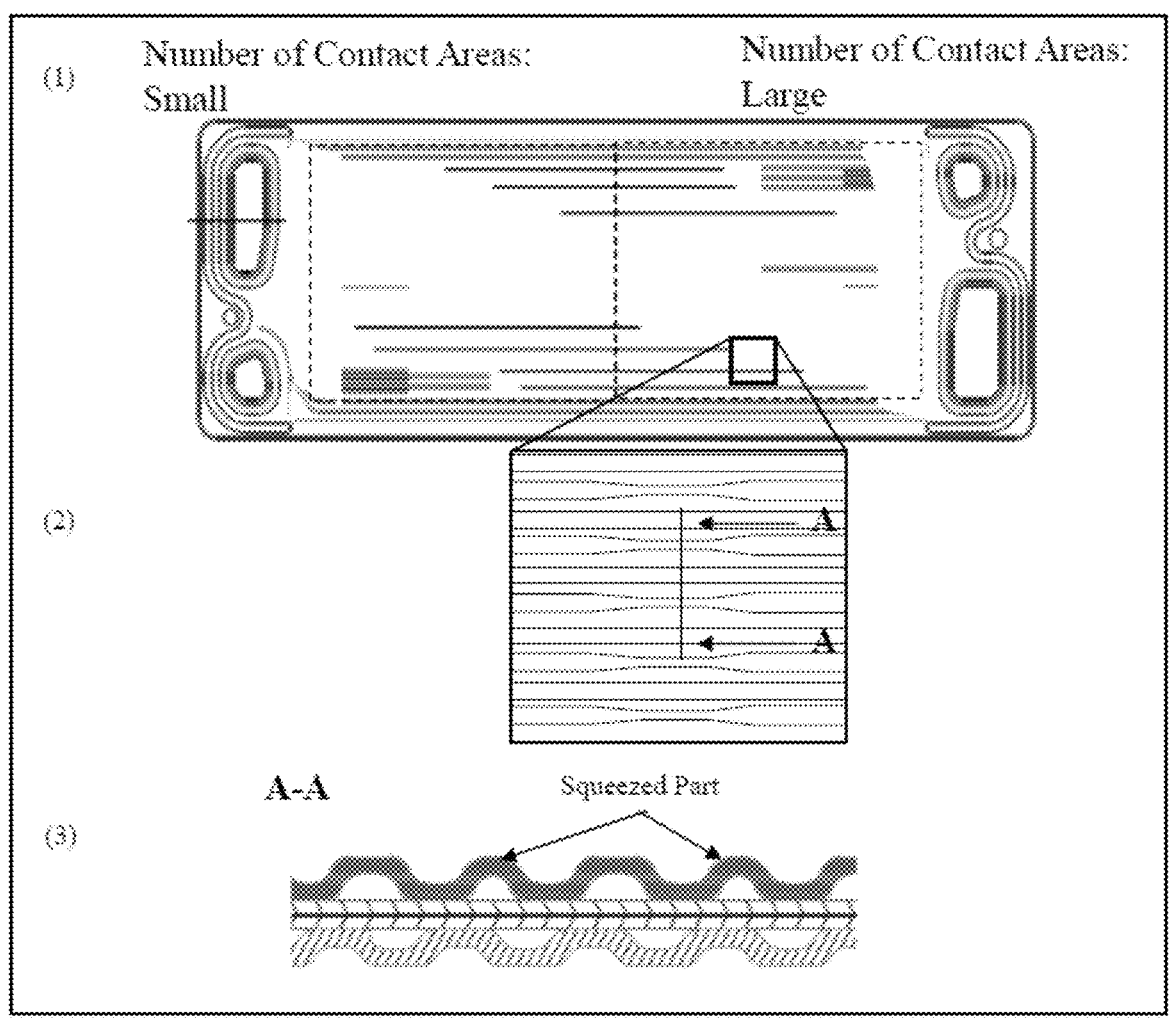
FIG. 8 shows, from top to bottom, (1) a view showing a state that in the air-cooled fuel cell system of the eighth embodiment, when a flow path provided with squeezed parts is applied to the oxidant gas flow path, the temperature distribution is varied by varying the distribution of contact parts between the cooling gas flow path and the ribs forming the squeezed parts, (2) a partial enlarged view of the view (1), and (3) a sectional view along the line A-A.

FIG. 8 shows, from top to bottom, (1) a view showing a state that in the air-cooled fuel cell system of the eighth embodiment, when a flow path provided with squeezed parts is applied to the oxidant gas flow path, the temperature distribution is varied by varying the distribution of contact parts between the cooling gas flow path and the ribs forming the squeezed parts, (2) a partial enlarged view of the view (1), and (3) a sectional view along the line A-A. In the eighth embodiment, to increase the diffusivity of the air for power generation (i.e., the oxidant gas) in the cell plane, the squeezed parts are disposed in the oxidant gas flow path. By the squeezed parts, the oxidant gas flow path is squeezed; the contact area between the cooling gas flow path and the ribs forming the oxidant gas flow path is decreased; and the cooling function of the cooling gas system is decreased, therefore. Using this mechanism, the number of the contact parts between the cooling gas flow path and the squeezed parts is changed to produce a heat dissipation distribution in the cell plane. The number of the contact parts between the cooling gas flow path and the squeezed parts is increased from the oxidant gas flow path inlet side to the oxidant gas flow path outlet side so that the number of the contact parts between the cooling gas flow path and the squeezed parts is smaller on the oxidant gas flow path inlet side than on the oxidant gas flow path outlet side. Accordingly, the temperature of the oxidant gas flow path outlet side is increased.

Ninth Embodiment

In the ninth embodiment, the cathode separator may have squeezed parts in a part of the oxidant gas flow path, and no squeezed parts may be disposed in a part where the cooling gas flow path and the oxidant gas flow path intersect and are in contact with each other when viewed from above.

Figure 9:
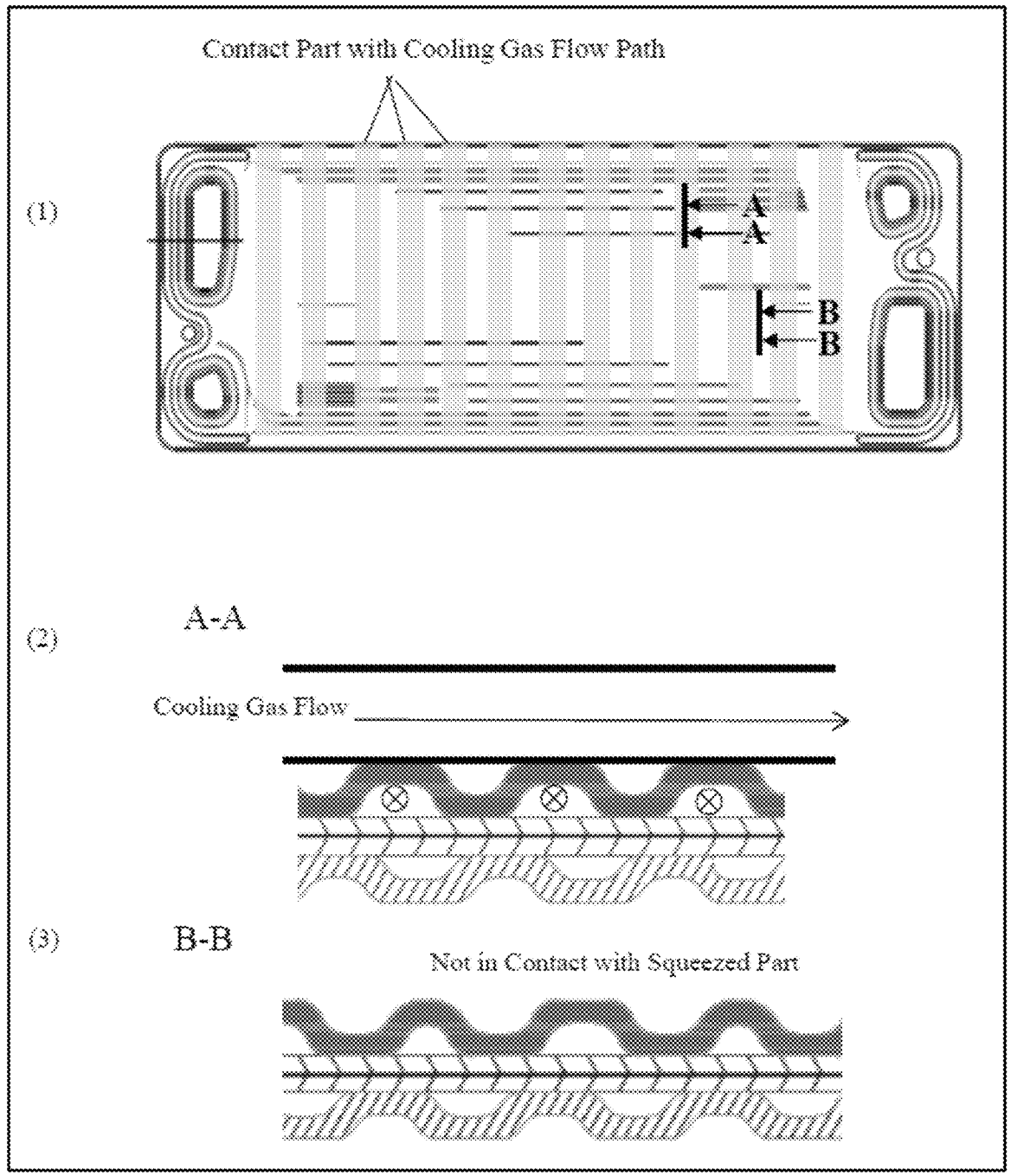
FIG. 9 shows, from top to bottom, (1) a view showing a structure such that in the air-cooled fuel cell system of the ninth embodiment, the contact resistance between the oxidant gas flow path and the cooling gas flow path is decreased by disposing the squeezed parts in positions not in contact with the cooling gas flow path, and a decrease in the power generation performance of the cell is prevented, (2) a sectional view along the line A-A, and (3) a sectional view along the line B-B.

FIG. 9 shows, from top to bottom, (1) a view showing a structure such that in the air-cooled fuel cell system of the ninth embodiment, the contact resistance between the oxidant gas flow path and the cooling gas flow path is decreased by disposing the squeezed parts in positions not in contact with the cooling gas flow path, and a decrease in the power generation performance of the cell is prevented, (2) a sectional view along the line A-A, and (3) a sectional view along the line B-B. As shown in FIG. 9, for increasing the power generation performance of the cell, the squeezed parts are disposed in the oxidant gas flow path. However, by disposing no squeezed parts in the contact parts with the cooling gas flow path, an increase in the contact resistance between the oxidant gas flow path and the cooling gas flow path is suppressed, and the oxidant gas outlet temperature is increased by another method.

In the present disclosure, the fuel gas and the oxidant gas are collectively referred to as "reaction gas". The reaction gas supplied to the anode is the fuel gas, and the reaction gas supplied to the cathode is the oxidant gas. The fuel gas is a gas mainly containing hydrogen, and it may be hydrogen. The oxidant gas may be oxygen, air, dry air or the like.

The air-cooled fuel cell system of the present disclosure includes the fuel cell, the oxidant gas system (a reaction air system) and the cooling gas system. In general, it further includes a fuel gas system.

The fuel cell of the present disclosure is an air-cooled fuel cell.

The air-cooled fuel cell mainly uses the air as the refrigerant. The refrigerant is not limited to the air, as long as the refrigerant is a gas having a cooling function, and another gas may be used as the refrigerant. In the present disclosure, the air used as the refrigerant may be referred to as "cooling gas" or "cooling air". Also in the present disclosure, the air used as the oxidant gas may be referred to as "reaction air".

The fuel cell comprises a fuel cell stack comprising stacked unit fuel cells. The number of the stacked unit fuel cells is not particularly limited, and two to several hundred unit fuel cells may be stacked.

Each of the unit fuel cells comprises the cathode separator having the oxidant gas flow path in the wavy plate form, the membrane electrode gas diffusion layer assembly, the anode separator having the fuel gas flow path in the wavy plate form, and the cooling fin having the cooling gas flow path in the wavy plate form The membrane electrode gas diffusion layer assembly (MEGA) includes an anode-side gas diffusion layer, an anode catalyst layer, an electrolyte membrane, a cathode catalyst layer and a cathode-side gas diffusion layer in this order.

In the present disclosure, the power generation unit mainly means the membrane electrode gas diffusion layer assembly.

The cathode (oxidant electrode) includes the cathode catalyst layer and the cathode-side gas diffusion layer.

The anode (fuel electrode) includes the anode catalyst layer and the anode-side gas diffusion layer.

The cathode catalyst layer and the anode catalyst layer are collectively referred to as "catalyst layer".

The cathode-side gas diffusion layer and the anode-side gas diffusion layer are collectively referred to as "gas diffusion layer" or "diffusion layer".

The gas diffusion layer may be a gas-permeable electroconductive member or the like.

As the electroconductive member, examples include, but are not limited to, a porous carbon material such as carbon cloth and carbon paper, and a porous metal material such as metal mesh and foam metal.

Each unit fuel cell may include a microporous layer (MPL) between the catalyst layer and the gas diffusion layer. The microporous layer may contain a mixture of a water repellent resin such as PTFE and an electroconductive material such as carbon black.

The electrolyte membrane may be a solid polymer electrolyte membrane. As the solid polymer electrolyte membrane, examples include, but are not limited to, a hydrocarbon electrolyte membrane and a fluorine electrolyte membrane such as a thin, moisture-containing perfluorosulfonic acid membrane. The electrolyte membrane may be a Nafion membrane (manufactured by DuPont Co., Ltd.), for example.

The anode separator and the cathode separator are collectively referred to as "separator".

The membrane electrode gas diffusion layer assembly is sandwiched by the anode separator and the cathode separator.

The separator may include through-holes for allowing a fluid such as the reaction gas to flow in the stacking direction of the unit fuel cells. As the through-holes, examples include, but are not limited to, oxidant gas supply holes, oxidant gas discharge holes, fuel gas supply holes and fuel gas discharge holes.

In the fuel cell, the reaction gas manifold may be formed by the same kind of through-holes connected in the stacking direction.

The separator may be a gas-impermeable electroconductive member or the like. As the electroconductive member, examples include, but are not limited to, a resin material such as thermosetting resin, thermoplastic resin and resin fiber, a carbon composite material obtained by press-molding a mixture containing a carbonaceous material such as carbon powder and carbon fiber, gas-impermeable dense carbon obtained by carbon densification, and a metal plate (such as a titanium plate, an iron plate, an aluminum plate and a stainless-steel (SUS) plate) obtained by press-molding. The separator may function as a collector.

The shape of the separator may be a rectangular shape, a horizontal hexagon shape, a horizontal octagon shape, a circular shape or a long circular shape, for example.

The cathode separator has the oxidant gas flow path in the wavy plate form. More specifically, the cathode separator periodically includes grooves, which serve as the oxidant gas flow path, and ribs at a predetermined groove pitch, alternately.

The cathode separator may have the squeezed parts in a part of the oxidant gas flow path.

The width of the squeezed parts may be smaller than the width of the oxidant gas flow path.

The anode separator has the fuel gas flow path in the wavy plate form. More specifically, the anode separator periodically includes grooves, which serve as the fuel gas flow path, and ribs at a predetermined groove pitch, alternately.

The groove pitch means the repeating unit of the sum of the groove width and the rib width.

The separator may include a reaction gas flow path on a surface in contact with the gas diffusion layer. Also, the separator may include a refrigerant flow path for keeping the fuel cell temperature constant, on the surface opposite to the surface in contact with the gas diffusion layer.

The separator may include a gas divider. The gas divider is disposed in a region between the reaction gas manifold and the reaction gas flow path, and it spreads and unspreads a gas flow from the reaction gas manifold to the power generation region. On the reaction gas inlet side, the gas divider has the structure of spreading the gas flow. On the reaction gas outlet side, the gas divider has the structure of unspreading the gas flow.

The cooling fin has the cooling gas flow path in the wavy plate form. More specifically, the cooling fin periodically includes grooves, which serve as the cooling gas flow path, and ribs at a predetermined fin pitch, alternately. The fin pitch has the same meaning as the groove pitch.

The cooling fin may be a corrugated plate including grooves configured to function as the cooling gas flow path.

As the cooling fin, a corrugated metal plate obtained by folding a metal plate such as an aluminum plate, a Ti plate and an SUS plate, may be used. The surface of the cooling fin may be subjected to electroconductive treatment with silver, nickel, carbon or the like.

The shape of the cooling fin may be a rectangular shape, a horizontal hexagon shape, a horizontal octagon shape, a circular shape or a long circular shape, for example.

At least a part of the oxidant gas flow path of the cathode separator and at least a part of the cooling gas flow path of the cooling fin may intersect with each other when viewed from above; they may intersect with each other in at least a part of a region facing the MEGA; or they may intersect with each other in the whole of the region facing the MEGA. The oxidant gas flow path of the cathode separator and the cooling gas flow path of the cooling fin may intersect at right angles when viewed from above.

Each unit fuel cell may include a resin frame.

The resin frame may be disposed in the periphery of the membrane electrode gas diffusion layer assembly and may be disposed between the cathode separator and the anode separator.

The resin frame may include a skeleton, an opening and a through-hole.

The skeleton is a main part of the resin frame, and it connects to the membrane electrode gas diffusion layer assembly.

The opening is a region retaining the membrane electrode gas diffusion layer assembly, and it is also a region penetrating a part of the skeleton to set the membrane electrode gas diffusion layer assembly therein. In the resin frame, the opening may be disposed in the position where the skeleton is disposed around (in the periphery) of the membrane electrode gas diffusion layer assembly, or it may be disposed in the center of the resin frame.

The through-hole of the resin frame allows the fluid such as the reaction gas to flow in the stacking direction of the unit fuel cells. The through-hole of the resin frame may be aligned and disposed to connect to the through-hole of the separator.

As the resin frame, a conventionally-known material may be used.

The fuel cell may include a gasket between adjacent unit fuel cells, which seals in the reaction gas.

The material for the gasket may be ethylene propylene diene monomer (EPDM) rubber, silicon rubber, thermoplastic elastomer resin or the like.

The air-cooled fuel cell system comprises the cooling gas system.

The cooling gas system comprises the cooling gas supplier configured to supply cooling gas to the fuel cell, the cooling gas pipe, and the pressure loss unit upstream from the fuel cell in the cooling gas pipe.

The cooling gas pipe comprises the pressure loss unit upstream from the fuel cell.

The pressure loss unit may be a filter or the like.

The cooling gas pipe connects the outside of the air-cooled fuel cell system and the cooling gas inlet of the fuel cell, and it connects the cooling gas outlet of the fuel cell and the outside of the air-cooled fuel cell system.

The cooling gas supplier may be disposed in any position of the cooling gas pipe, and it may be disposed downstream from the fuel cell in the cooling gas pipe.

As the cooling gas supplier, examples include, but are not limited to, an air pump, an air compressor, an air blower and an air fan.

The cooling gas supplier is electrically connected to the controller. The cooling gas supplier is operated according to a control signal from the controller. The flow rate of the cooling gas supplied from the cooling gas supplier to the fuel cell is controlled by the controller. The temperature of the fuel cell may be controlled thereby.

The structure of the cooling gas system is an atmospheric release structure having no valve, and the pressure of the cooling air is equal to the outside pressure (e.g., −0.01 kPaG to −0.3 kPaG). Accordingly, the fuel cell structure is prevented from being exposed to stress associated with pressure difference, and the use of a lightweight, inexpensive housing material is allowed.

The air-cooled fuel cell system includes the oxidant gas system (the reaction air system).

The oxidant gas system may include an oxidant gas supplier, an oxidant gas pipe, an oxidant gas pressure control valve and so on.

The oxidant gas pipe connects the outside of the air-cooled fuel cell system and the oxidant gas inlet of the fuel cell, and it connects the oxidant gas outlet of the fuel cell and the outside of the air-cooled fuel cell system.

The oxidant gas supplier supplies the oxidant gas to the cathode of the fuel cell.

The oxidant gas supplier may be disposed in any position of the oxidant gas pipe, and it may be disposed upstream from the fuel cell in the oxidant gas pipe.

As the oxidant gas supplier, examples include, but are not limited to, an air pump, an air compressor, an air blower and an air fan.

In the oxidant gas system, the oxidant gas supplier is independently disposed before the introduction of the oxidant gas into the fuel cell. By independently disposing the cooling gas supplier and the oxidant gas supplier in the cooling gas system and the oxidant gas system, respectively, the flow rate of the cooling air and that of the reaction air (the oxidant gas) are independently controlled; water discharge properties and humidity are precisely controlled; and the power generation performance of the fuel cell is increased.

The oxidant gas supplier is electrically connected to the controller. The oxidant gas supplier is operated according to a control signal from the controller.

In general, the air-cooled fuel cell system includes the fuel gas system.

The fuel gas system supplies the fuel gas to the fuel cell.

The fuel gas system may include a fuel gas tank for storing the fuel gas, a fuel gas supply pipe connecting the fuel gas tank to the fuel gas inlet of the fuel cell, and a fuel gas discharge pipe connecting the fuel gas outlet of the fuel cell to the outside of the air-cooled fuel cell system, for example.

The air-cooled fuel cell system may include the controller.

The controller controls the turning ON/OFF of the cooling gas supplier, the oxidant gas supplier and so on, and the output thereof, for example.

The controller physically includes a processing unit such as a central processing unit (CPU), a memory device such as a read-only memory (ROM) and a random access memory (RAM), and an input-output interface. The ROM is used to store a control program, control data and so on to be processed by the CPU, and the RAM is mainly used as various workspaces for control processing. The controller may be a control device such as an electronic control unit (ECU).

The invention claimed is:

1. An air-cooled fuel cell system,
   wherein the air-cooled fuel cell system comprises a fuel cell, an oxidant gas system and a cooling gas system;
   wherein the fuel cell comprises a fuel cell stack comprising stacked unit fuel cells;
   wherein each of the unit fuel cells comprises a cathode separator having an oxidant gas flow path in a wavy plate form, a membrane electrode gas diffusion layer assembly, an anode separator having a fuel gas flow path in a wavy plate form, and a cooling fin having a cooling gas flow path in a wavy plate form;
   wherein at least a part of the oxidant gas flow path and at least a part of the cooling gas flow path intersect with each other when viewed from above;
   wherein the cooling gas system comprises a cooling gas supplier configured to supply cooling gas to the fuel cell, a cooling gas pipe, and a pressure loss unit upstream from the fuel cell in the cooling gas pipe; and
   wherein the air-cooled fuel cell system has a cooling ability distribution in an oxidant gas flow direction of the oxidant gas flow path.

2. The air-cooled fuel cell system according to claim 1, wherein the cooling gas system has a high ability to cool an inlet side of the oxidant gas flow path and a low ability to cool an outlet side of the oxidant gas flow path.

3. The air-cooled fuel cell system according to claim 1, wherein the oxidant gas flow path and the cooling gas flow path have a contact area distribution such that the contact area between the oxidant gas flow path inlet side and the cooling gas flow path is larger than the contact area between the oxidant gas flow path outlet side and the cooling gas flow path, and the contact area decreases from the oxidant gas flow path inlet side to the oxidant gas flow path outlet side.

4. The air-cooled fuel cell system according to claim 1, wherein the pressure loss unit has a pressure loss distribution such that in a flow direction of the oxidant gas flow path, the press pressure is lower on the oxidant gas flow path inlet side than on the oxidant gas flow path outlet side, and the pressure loss increases from the oxidant gas flow path inlet side to the oxidant gas flow path outlet side.

5. The air-cooled fuel cell system according to claim 1, wherein the cooling gas supplier is disposed on the oxidant gas flow path inlet side, rather than the center of the oxidant gas flow path.

6. The air-cooled fuel cell system according to claim 1, wherein the cooling fin has a fin pitch distribution such that in the flow direction of the oxidant gas flow path, the fin pitch of the cooling gas flow path is narrower on the oxidant gas flow path inlet side than on the oxidant gas flow path outlet side.

7. The air-cooled fuel cell system according to claim 1, wherein the contact area between the cooling gas flow path and the oxidant gas flow path is smaller on the cooling gas flow path inlet side than on the cooling gas flow path outlet side.

8. The air-cooled fuel cell system according to claim 1,
   wherein the cathode separator has squeezed parts in a part of the oxidant gas flow path, and
   wherein, in a part where the cooling gas flow path and the oxidant gas flow path intersect and are in contact with each other when viewed from above, a number of contact parts between the cooling gas flow path and the squeezed parts increases from the oxidant gas flow path inlet side to the oxidant gas flow path outlet side.

9. The air-cooled fuel cell system according to claim 1,
   wherein the cathode separator has squeezed parts in a part of the oxidant gas flow path, and
   wherein no squeezed parts are disposed in a part where the cooling gas flow path and the oxidant gas flow path intersect and are in contact with each other when viewed from above.

* * * * *